(12) United States Patent
Mestha et al.

(10) Patent No.: US 7,684,082 B2
(45) Date of Patent: Mar. 23, 2010

(54) METHOD AND SYSTEM FOR COMPENSATING FOR THERMOCHROMATICITY DIFFERENCES IN INLINE SPECTROPHOTOMETERS

(75) Inventors: Lalit Keshav Mestha, Fairport, NY (US); Tonya L. Love, Rochester, NY (US); Dennis M. Diehl, Penfield, NY (US); Daniel A. Robbins, Williamson, NY (US)

(73) Assignee: Xerox Corporation, Norwalk, CT (US)

( * ) Notice: Subject to any disclaimer, the term of this patent is extended or adjusted under 35 U.S.C. 154(b) by 370 days.

(21) Appl. No.: 11/737,576

(22) Filed: Apr. 19, 2007

(65) Prior Publication Data

US 2008/0259374 A1    Oct. 23, 2008

(51) Int. Cl.
*G06F 15/00* (2006.01)
(52) U.S. Cl. .................. 358/1.9; 358/504; 345/426
(58) Field of Classification Search ............... 358/1.9, 358/504; 345/426
See application file for complete search history.

(56) References Cited

U.S. PATENT DOCUMENTS

| | | | |
|---|---|---|---|
| 5,884,118 | A | 3/1999 | Mestha et al. |
| 6,351,308 | B1 | 2/2002 | Mestha |
| 6,384,918 | B1 | 5/2002 | Hubble, III et al. |
| 6,449,045 | B1 | 9/2002 | Mestha |
| 6,538,770 | B1 | 3/2003 | Mestha |
| 6,556,300 | B2 | 4/2003 | Tandon et al. |
| 6,556,932 | B1 | 4/2003 | Mestha et al. |
| 6,584,435 | B2 | 6/2003 | Mestha et al. |
| 6,587,793 | B2 | 7/2003 | Viassolo et al. |
| 6,603,551 | B2 | 8/2003 | Mestha et al. |
| 6,639,669 | B2 | 10/2003 | Hubble, III et al. |
| 6,650,416 | B2 | 11/2003 | Tandon et al. |
| 6,690,471 | B2 | 2/2004 | Tandon et al. |
| 6,721,692 | B2 | 4/2004 | Mestha et al. |
| 6,750,442 | B2 | 6/2004 | Bala et al. |
| 6,809,855 | B2 | 10/2004 | Hubble, III et al. |
| 6,975,949 | B2 | 12/2005 | Mestha et al. |
| 7,110,142 | B2 | 9/2006 | Mestha et al. |
| 2003/0009454 | A1* | 1/2003 | Kim et al. .............. 707/3 |
| 2003/0081214 | A1 | 5/2003 | Mestha et al. |
| 2005/0160092 | A1 | 7/2005 | Mestha et al. |
| 2006/0152718 | A1 | 7/2006 | Mestha et al. |
| 2006/0218172 | A1 | 9/2006 | Mestha |
| 2006/0221337 | A1 | 10/2006 | Mestha et al. |
| 2006/0221341 | A1 | 10/2006 | Paul et al. |

\* cited by examiner

*Primary Examiner*—Twyler L Haskins
*Assistant Examiner*—Michael Burleson
(74) *Attorney, Agent, or Firm*—Fay Sharpe LLP

(57) ABSTRACT

An algorithmic method is identified for compensating for thermochromaticity errors in insitu spectral color measurements of a color printing device. A difference is mapped between spectral measurements of a printed color generated by the color printing device measured at a first or hot temperature and at a second or cool ambient temperature where the mapping comprises a referenceable characteristic of the color printing device. The spectrophotometric measurement of a hot color is compared with colors obtained with thermochromaticity compensation matrix to assess if the measured color corresponds to the desired color which will result when cooled to ambient temperature.

14 Claims, 3 Drawing Sheets

METHOD AND SYSTEM FOR COMPENSATING FOR THERMOCHROMATICITY DIFFERENCES IN INLINE SPECTROPHOTOMETERS

TECHNICAL FIELD

A method and system for printer color modeling is disclosed, and more particularly a spectrophotometric color measurement system in the output path of a color printing system which measures colors at a first temperature, typically hot, at an embedded "just-fused" location, and relates the measured colors to a desired output color at a second temperature, i.e. a cooled ambient temperature. The measured color is converted via a thermochromatic matrix to what is expected for the measured color in response to a particular input signal, thereby providing a real time conversion to the anticipated output color when cooled to the ambient temperature. Printer operability can be assessed by verifying predicted color accuracy or adjusting the input signal to compensate for a measured difference between the anticipated output color and an actually measured ambient temperature color.

BACKGROUND

In many business applications, color documents have become essential as a component of communication. Color facilitates the sharing of knowledge and ideas. Companies involved in the development of color output devices continue to look for ways to improve the total image quality of such devices. One of the elements that affects the perception of image quality is an ability to consistently produce the same quality image output on a printer from one day to another, from one week to the next, month after month. Users are accustomed to printers and copiers that produce high quality color and gray scale output. Users further expect to be able to reproduce a color image with consistent quality on any compatible output device, including another device within an organization, a device at home or a device used anywhere else in the world. Hence, there remains a commercial need for efficiently maintaining print color predictability, particularly as electronic marketing has placed more importance on the accurate representation of merchandise in illustrative print or display media.

Color rendering devices (e.g., a printer, copier, or other image output device) often have problems with maintaining accurate color outputs overtime due to many normally expected operational variations, e.g., printer drift, temperature and humidity variations, system aging, or the like. Accordingly, online, real-time calibration to maintain consistent and accurate color outputs is always a design and operational objective.

Inline spectrophotometric measuring systems for sensing reflectance vectors indicative of the colors produced by the color rendering device are well known, cf. U.S. Pat. No. 6,384,918 by Hubble III, et al.

Because real-time calibration is an important design objective, any embedded inline spectrophotometric measuring system must necessarily measure the colors on a printed substrate at a time before the substrate has cooled to an ambient temperature. Typically the measuring system is embedded at a location near the fuser so that the output is measured at a "just-fused" location within the output device and the substrate is at a temperature above where it will be when the print output has had an opportunity to cool to ambient temperature.

Recent data from operational studies of inline spectrophotometric systems suggest that color measurement differences occur between colors, when measured at the embedded location, with respect to similar measurements of the same prints made at ambient temperature. Such color measurement differences can be responsible for significant accuracy errors between the ultimately desired output color and the actual output color. The table below identifies empirically-determined error differences ("deltaE, or dE*") in a range between a measurement at 60.0° C. and an ambient temperature of 22.0° C.

TABLE 1

| T (deg C.) | dE* from 22 deg C. (lab ambient) | | | | | |
| --- | --- | --- | --- | --- | --- | --- |
| | K100 | B100 | C100 | M100 | P5255 | Paper White |
| 22.0 | 0.00 | 0.00 | 0.00 | 0.00 | 0.00 | 0.00 |
| 25.0 | 0.15 | 0.17 | 0.21 | 0.20 | 0.25 | 0.06 |
| 30.0 | 0.24 | 0.67 | 0.40 | 0.45 | 0.20 | 0.05 |
| 35.0 | 0.19 | 0.20 | 0.82 | 0.24 | 0.30 | 0.34 |
| 40.0 | 1.22 | 1.37 | 0.70 | 0.87 | 0.16 | 0.10 |
| 45.0 | 1.91 | 1.46 | 0.97 | 1.81 | 0.14 | 0.13 |
| 50.0 | 4.78 | 3.09 | 1.05 | 1.54 | 0.40 | 0.20 |
| 55.0 | 3.73 | 2.30 | 1.93 | 2.56 | 0.51 | 0.19 |
| 60.0 | 4.07 | 2.92 | 1.03 | 1.53 | 0.35 | 0.11 |

More particularly, it can be seen that the first or left-side column is the temperature of the printed substrate in degrees Centigrade ranging from 60.0° C. to 22.0° C. (60.0° C. is about the maximum temperature of the measured color at an embedded location near the fuser wherein the substrate has received an image and the image has just been fused thereon.) The entire table is relevant as a mapped reference for relating differences between the temperature of the measured color and ambient (22.0° C.). The table illustrates how the sensor reflectance vectors can vary with the change in temperature. The vertical columns represent one hundred percent saturated black ("K100"), blue ("B100"), cyan ("C100"), magenta ("M100"), a selected pantone color ("P5255") and paper white. The table suggests that there are significant deltaE results for fused prints between the desired output color when it has cooled to ambient temperature, and what can be measured from the exact same substrated color at a higher temperature. For example, the deltaE for a fully saturated black, K100, has a 4.07 value difference from the exact same output and substrate at an ambient temperature of 22.0° C. If such a difference is not anticipated, and a compensation plan is not executed, color accuracy diminishes.

Accordingly, when an input signal is provided to the output device, which is supposed to generate a corresponding output color at an ambient temperature, the use of an inline spectrophotometric system measuring and relying upon only hotter colors, will not be able to verify that the color output is accurate and consistent with the intended color due to these naturally occurring thermochromaticity errors. The mistaken reliance on the measurement of a just-fused hot color to be the output cool color produces a mistaken, and inaccurate color printing system.

There is a need for a thermochromatic compensation system which can accommodate differences in color due to thermochromatic changes naturally occurring as a hot just-fused print substrate cools to an ambient temperature. Such a system would be useful to providing a more accurate and consistent color printing system for its compensation for thermochromatic measured errors, thereby increasing system robustness against thermal machine warm up, and the temperature drift due to normal machine aging or extended continuous job execution.

For the purpose of this invention, it is important to note that the errors between the measurements taken at a "just-fused" location within the output device, and when the print output had an opportunity to cool to ambient temperature are broadly grouped under "thermochromaticity error", although the phrase "thermochromaticity" is referred specifically to chromatic shift occurring in color pigments with change in temperature. For example, there could be shift in lightness component (i.e., L*) of the color occurring when glossy images are cooled. We have grouped such kind of shifts occurring due to change in temperature as "thermochromaticity" errors.

SUMMARY

According to aspects illustrated herein, there is provided an algorithmic method to compensate for thermochromatic differences in insitu spectral color measurement systems within a color printed device. A mapping model is made from empirical data comprising the differences between spectral measurements of a printed color generated by the color printing device at a first temperature and a second temperature. The spectrophotometric sensor measures a generated color at an embedded location where the measurement occurs at about the first temperature. The mapping determines what color will result when the temperature cools to the ambient or second temperature. System performance is then assessed based on the predicted, map-determined cool color.

DETAILED DESCRIPTION

Figure 1:
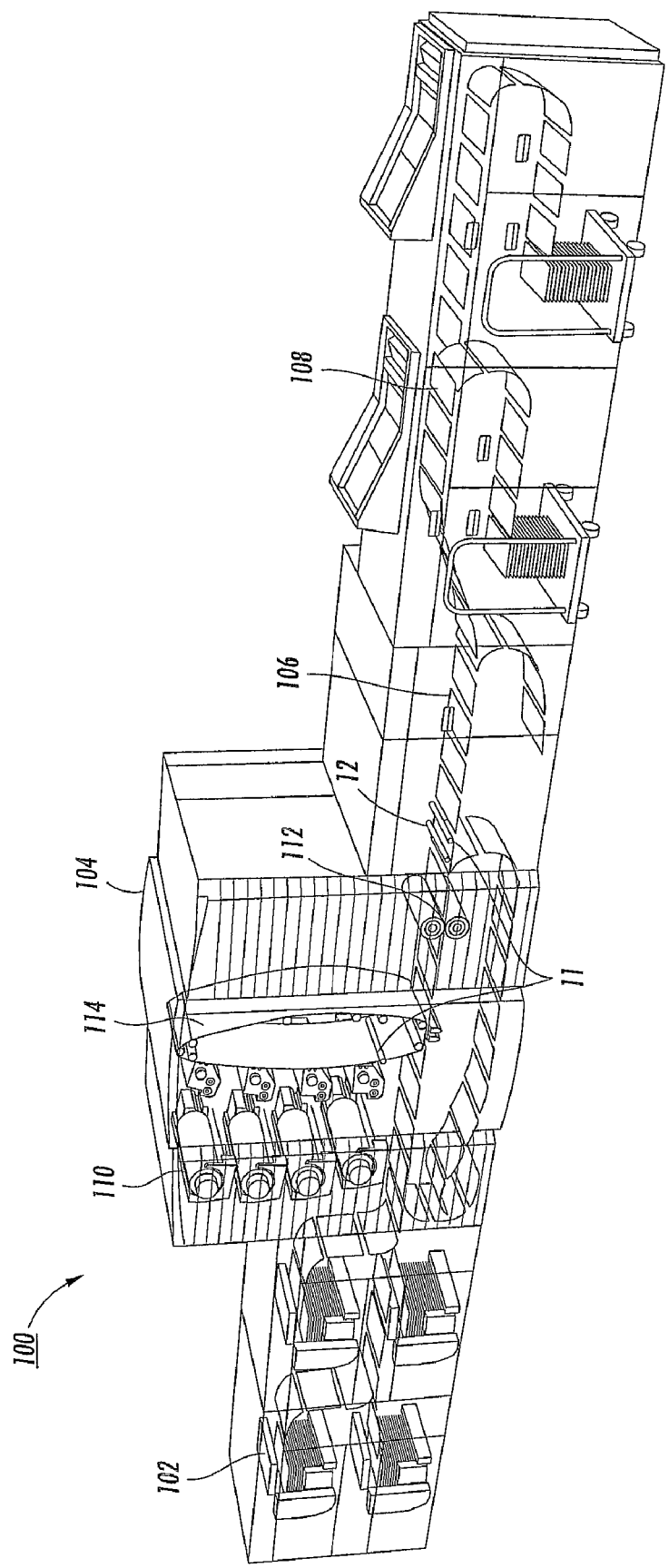
FIG. 1 is an exemplary embodiment of a print system including an embedded spectrophotometer.

The system and method will be described in connection with preferred embodiments, however, it will be understood that there is no intent to limit the scope to the embodiments described. On the contrary, the intent is to cover all alternatives, modifications, and equivalents as may be included within the spirit and scope of the appended claims. Referring now to the drawings, the Figures show a method and apparatus for operating a printer or similar output device wherein thermochromatic differences in color between a "hot" just-fused color and a cooled, ambient temperature color are recognized and exploited for better color accuracy.

The method and system use a combination of a full-width array (FWA) or similar page-scanning mechanism in conjunction with an on-line spectrophotometer color measurement system in the output path of a color printer for measuring colors (e.g., on printed test sheets, banner/separation pages, etc.) without requiring any manual operations or operator involvement The automatic color balance control system produces multi-dimensional LUT (Look-Up Table) values for the CMYK primary colors by printing patches, measuring colors and automatically re-adjusting the LUTs until a satisfactory level of accuracy is obtained. While producing spatially adjusted LUTs, the system will automatically lock the printer output to some predetermined color patch targets. The process is enabled either by the system controller or by a user with minimal interaction.

A physical implementation of this controller is depicted in FIG. 1, which shows the Xerox iGen3™ 110 Digital Production Press, a printer or similar output device 100 providing a xerographic printing system suitable for practicing the method disclosed herein. Printer 100 includes a source of paper or printable substrates 102 that is operatively connected to a printing engine 104, and output path 106 and finisher 108. As illustrated, the print engine 104 is a multi-color engine having a plurality of imaging/development subsystems 110, that are suitable for producing individual color images (e.g., CMYK) on belt 114, where the belt then transfers the images to the substrate. A full-width array (FWA) scanner bar 11 measures color values either in the belt 114 (P/R or IBT) or on paper. The measured color reflectivities are then spatially mapped for corresponding associating with the desired color value signals to form a model which can in real-time, spectrophotometrically measure non-ambient temperature colors, yet maintain accurate ambient color outputs.

Figure 2A:
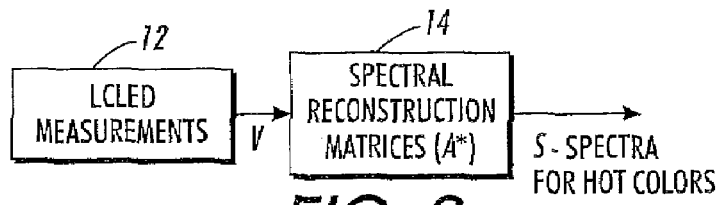
FIGS. 2a-2c comprise block diagrams/flowcharts of a system for converting inline measurements to an output spectra S; and, FIG. 3 is a flowchart exemplifying a print system operation with consideration of thermochromatic color measurements.
Figure 2B:
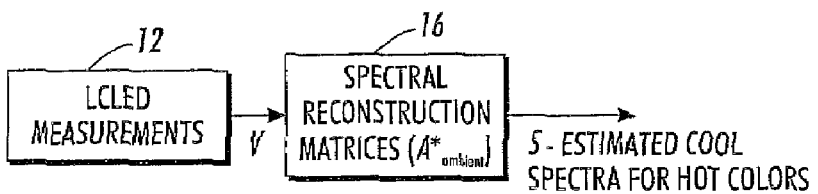
Figure 2C:
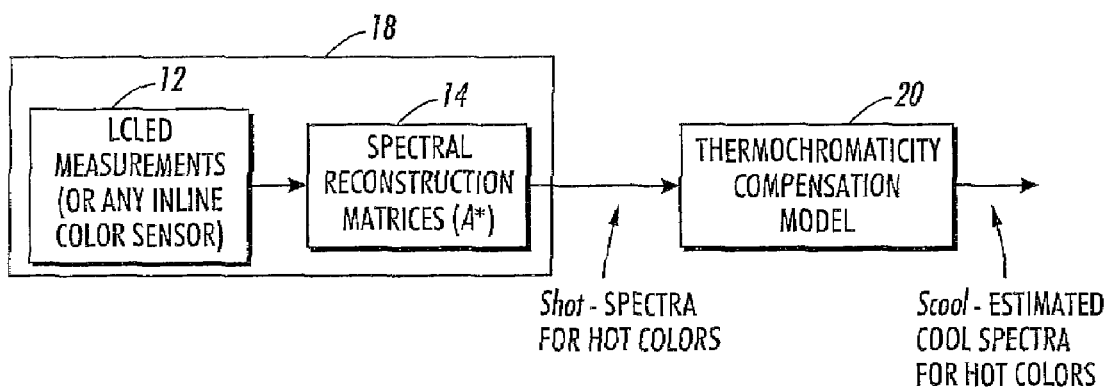

FIGS. 2a-c depict block diagrams representing other notable system elements providing an embodiment for operation of the disclosed method for compensating for thermochromatic errors in the print system. FIG. 2a is a conventional system wherein the colors measured by a first color sensing device 12 such as a spectrophotometer that provides spectral information comprising a representative signal of the printed colors of the image and preferably comprises L*, a*, b* values, XYZ, etc. values depending on the desired color description. One such spectrophotometer may be that disclosed in U.S. Pat. No. 6,384,918 by Hubble, III et al. for a SPECTROPHOTOMETER FOR COLOR PRINTER COLOR CONTROL WITH DISPLACEMENT INSENSITIVE OPTICS, the disclosure of which is hereby incorporated by reference. The spectrophotometer is for non-contact measurement of colored target areas such as test patches on moving printed test sheets in an output path of a color printer, where test patches may be sequentially angularly illuminated with multiple different colors, and a photosensor providing electrical signals in response. The spectrophotometer includes a lens system for transmitting that reflected illumination (multiple illumination sources comprise approximately eight or more individual LEDs) from the test patch. The exemplary spectrophotometer provides non-contact color measurements of moving color target areas variably displaced therefrom within normal paper-path baffle spacings. The vector $V=[V_m 1]^T$, represents the measurements made on new colors by the inline sensor. T is the transpose operator. Matrix A* 14 represents the spectral reconstruction matrix shown as single matrix A* for simplicity. S is the spectra obtained by solving Equation 2 below (i.e., S=A*V). Matrix A* is not constructed for handling thermochromaticity differences so that output S is a spectra of hot, just-fused color values which are assessed inline for color consistency with a corresponding input signal designating the printed color value, regardless of, upon cooling, the color changes to a perceivably different color. The failure to anticipate such color changes produces undesirable inaccuracies in the cooled output document.

With reference to FIG. 2b, a different set of matrices ($A^*_{ambient}$) is used to reconstruct the output spectra. As before, The vector $V=[V_m 1]^T$, represents the measurements made on new colors by the inline sensor. T is the transpose operator. However, matrix $A^*_{ambient}$ 16 represents the spectral reconstruction matrix compensated for thermochromaticity errors using the thermochromaticity matrix M which is obtained after solving Equation 3 below. A single matrix $A^*_{ambient}$ is shown for simplicity. S is the spectra obtained by solving the equation $S=A^*_{ambient}V$.

In many cases, raster image processing (RiPping) of the images is carried out off-line and at the time of printing and the color adjustment be achieved by merely adjusting the LUTs of the pre-RiPped images. The embodied systems and methods achieve a particular output image color, and therefore more accurate output printing, by producing color-adjusted, spatial LUTs at convenient and desirable times (typically during preset intervals like the beginning of a job or throughout long jobs as periodically needed to maintain accuracy) to ensure that the requested colors can be produced. These LUTs are generated by printing mixed color patches of specified target patches of primary colors—CMYK. The RIPped image can then be processed with color-adjusted LUTs easily inside the DFE for facilitating the use of reprinting RIPped jobs without going through a costly and time consuming re-RIPping process.

After the spatial color information is measured by the in-line spectrophotometer 12, and the spatial 2-D reflectance or L*, a*, b* information is measured by a scanner bar (not shown) on the belt or paper, two-dimensional or three-dimensional calibration techniques can be employed for spatially adjusting the LUT pixel index table.

Accordingly, an accurate LUT for the print system is generated by such a basic calibration technique for reliably generating accurate colors in response to corresponding input signals.

As noted above, the spectrophotometer 12 is embedded in the system at a location near where the colors are fused on to a substrate. The color at that position is at a "just-fused" temperature higher than ambient. A temperature sensor (not shown) can be used to detect the temperature of a color at this location. Alternatively, a temperature sensor need not be used in favor of data records reflecting normal substrate color and system temperatures at the spectrophotometer location.

The aforementioned calibration techniques can be used to generate a thermochromaticity compensation matrix, M, (which can also be referred to as a thermochromaticity model) as part of the control of a print system. Such a model is formed in the following manner.

The reference sensing system 12 is embedded in the system 100 at the mounting location shown in FIG. 1. For example, in an iGen system, the inline spectrophotometer is located in the velocity change module. The sample colors used for thermochromaticity compensation are printed and measured at this location before the colors are cooled. Let $V_m$ represent the set of sensor reflectance vectors for colors m=1, 2, . . . , N where N is the total number of thermochromaticity test colors (e.g., N=75). For simplicity, these measurements can be called "hot colors". Now let $Z_m$ represent the set of sensor reflectance vectors measured for the corresponding m=1, 2, . . . , N colors by the reference spectrophotometer (e.g., a non-embedded XRite938 sensor for measuring cooled prints). These measurements are the "ambient colors". The reference spectrophotometer measurement can be made on the test bench or on a paper path fixture with a reference inline sensor. The reference spectrophotometer measurements have to be made after the prints are cooled to the nominal room temperature.

A linear model (linear affine, quadratic affine or cubic affine, etc.,) can represent the relationship between "hot colors" and "ambient colors" with reasonable precision. The following linear model relates the measurement set between two data sets.

$$Z=MV \quad (A1)$$

where $Z=[Z_m 1]^T$ and $V=[V_m 1]^T$ are of size 32×1 for each sensor measurements, when 31 reflectance values are available for the spectral sensor. If the sensor outputs are in L*a*b* coordinate space, then this number is 4. Z and V are vectors formed by augmenting the measurements with scalar value 1 to include an affine term. If quadratic or other terms are included, then the number of elements in these vectors and the matrix M correspondingly increase. This matrix M is the thermochromaticity compensation matrix.

A weighted least square criteria minimization approach is used to compute the matrix M optimally. The optimal solution for matrix M, called M*, is obtained by minimizing the objective function defined as $$M^* = \underset{M}{\operatorname{argmin}} J = \underset{M}{\operatorname{argmin}} \sum_{i=1}^{N} w(i) \|Z_i - MV_i\|^2 \quad (A2)$$

where $$w(i) = \frac{1}{d(i)^P + \varepsilon}; \quad D(i) = \|Z_i - V_i\| \quad (A3)$$

p is an integer number, and ε is a small positive constant. i represents the index for the color samples. Appropriate values for p and ε may be empirically determined. In most cases, p and ε can be zero. The solution to the above optimization problem can be easily obtained by setting the gradient of J with respect to M equal to zero. This results in $$M^* = QP^{-1} \quad (A4)$$

where $$Q = \sum_{i=1}^{N} w(i) Z_i V_i^T \quad (A5)$$

and $$P = \sum_{i=1}^{N} w(i) V_i V_i^T \quad (A6)$$

Once M* is computed, this matrix is stored in the sensor or inside the software for future use. The estimated measurements of "hot colors" at ambient temperature is obtained by the following equation.

$$\hat{Z} = M^* V \quad (A7)$$

This equation gives the thermochromaticity compensation matrix for modifying spectral or L*a*b* values from the inline sensor data to ambient condition. The vector $V=[V_m \cdot 1]^T$ represents the measurements made on new colors by the inline sensor. (T is the transport operator) $V_m$ contains 31 reflectance values when 31 reflectances in the spectral curve are produced as output by the inline sensor within the 400 nm to 700 nm spectral band. This vector $V_m$ contains three color values when L*a*b* or RGB or XYZ are produced as the output by the inline sensor.

Figure 3:
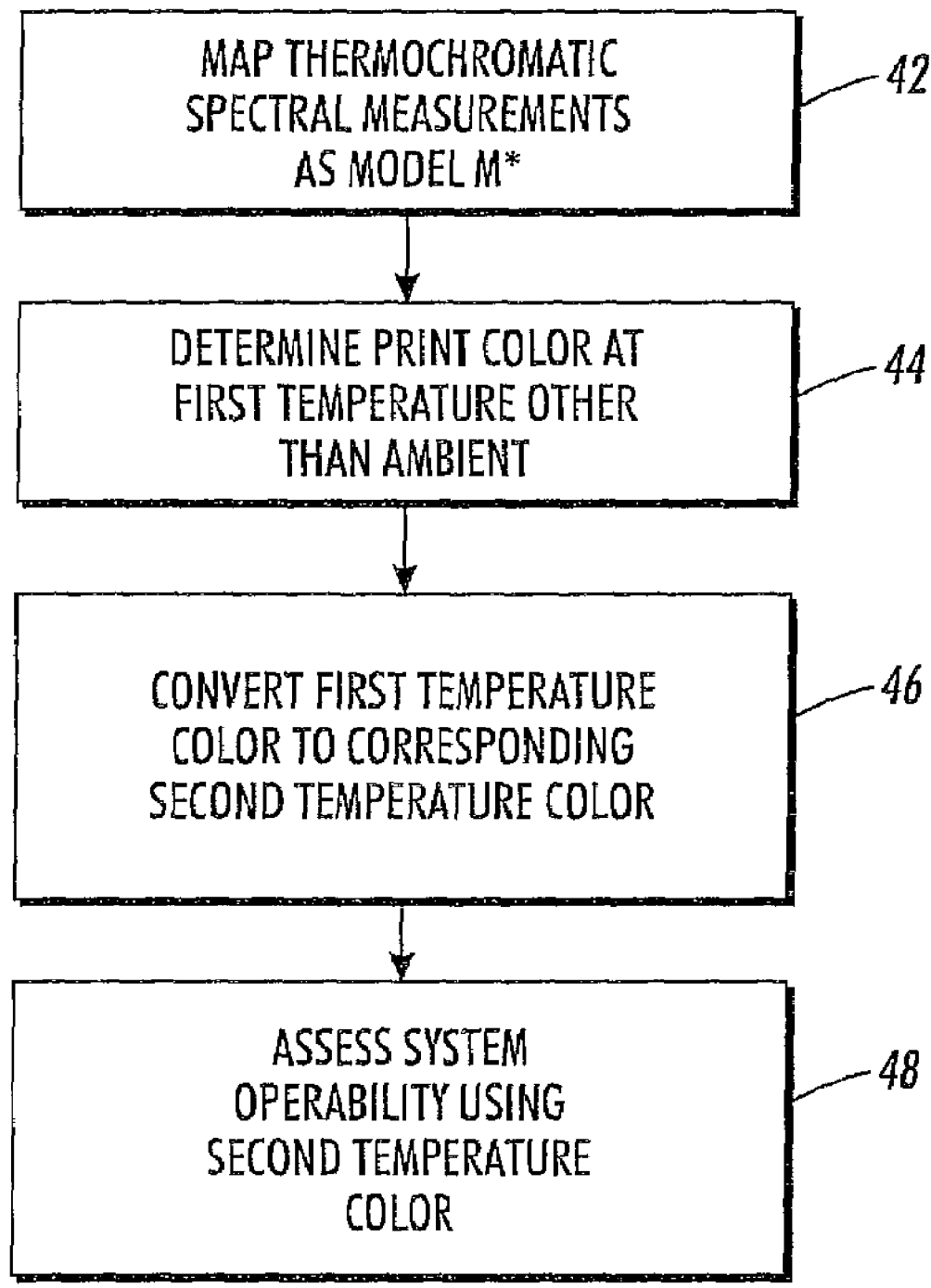

With reference to FIGS. 2c and 3, the subject embodiments can be applied to general inline spectral/L*a*b*/color sensors wherein the spectral reconstruction matrix lacking thermochromaticity error compensation is employed. The color sensor 18 in FIG. 2c can comprise any inline color sensor (e.g., could be with LED technology, or grating bases, or MEMS based) wherein the output spectra S is hot for the just-fused color measurements, i.e., the same system as shown in FIG. 2a. In this case, the sensor 12 will map 42 the thermochromatic spectral measurements as model M* and then determine 44 the print color at a first temperature, usually other than ambient. In FIG. 2b, the reconstruction matrices $A^*_{ambient}$ immediately converted the first temperature color to a corresponding second temperature color, usually the color ambient color. In FIG. 2c a thermochromaticity compensation model 20 adjusts the spectral output from the color sensor 18 to generate a spectral output comprising an estimation of cool spectra for the measured hot colors. Accordingly, this conversion 46 can occur with a spectral reconstruction matrix $A^*_{ambient}$ operating on the measurements, or merely mathematically modeling conventional reconstruction matrices, A* as in FIG. 2c.

Thermochromatically adjusted color measurements can then be used to assess 48 system operably. Such assessment may typically include system color calibration, more accurate color measurement of a color output device, or real time color measurement of the output device for purposes of modeling a printing system.

The spectral reconstruction matrix, A* used in LCLED sensors are of size 31×9 elements. They are constructed for each cell by partitioning the reference database into clusters. These spectral reconstruction matrices can be adjusted with the thermochromaticity compensation matrix to obtain estimation of inline measurements under ambient condition. The uncompensated reconstruction matrices for each cluster are used to construct spectra every time a new measurement is made (see Equation 2 below).

$$\hat{S}=A^*V \quad (2)$$

Now, the compensated spectral reconstruction matrices for thermochromaticity errors is given by Equation 3 below.

$$A^*_{ambient}=A^*M^{-1} \quad (3)$$

This type of adjustments to spectral reconstruction matrices may be required for each sensor depending on the desired performance.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for color measurement of a color output device, wherein output colors of the device vary in color during a time of cooling from a just-fused temperature to an ambient temperature, the variance in color being represented by a thermochromatic model, comprising:
    measuring with a color imaging device insitu color of a print output of the color output device at a first temperature;
    transforming the measured insitu color measurement to a corresponding output ambient color from the thermochromatic model; and
    using the corresponding output ambient color metric as a basis for assessing operability of the color output device.

2. The method of claim 1 wherein the measuring comprises spectrophotometric measuring of just-fused prints inline the color output device.

3. The method of claim 1 wherein the assessing comprises real-time assessing of the output device.

4. The method of claim 1 wherein the converting comprises predetermining a thermochromaticity compensation matrix from empirical data including a set of sensor reflectance vectors.

5. The method of claim 4 wherein the assessing comprises calibrating the color output device by adjusting an input signal to the color output device corresponding to the measured insitu color in a manner wherein the insitu measuring of an output color corresponds to the desired output ambient color.

6. The method of claim 1 including determining a temperature of the print output at the measuring insitu color.

7. An algorithmic method to compensate for thermochromaticity errors in insitu spectral color measurements of a color printing device comparing;
    mapping a difference between spectral measurements of a printed color generated by the color printing device measured at a first temperature and at a second temperature wherein the mapping comprises a referenceable characteristic of the color printing device;
    measuring a selected color corresponding to a color input signal representing a desired color at the second temperature, wherein the selected color is measured at the first temperature using a color measuring device;
    transforming the measured color measurement to a corresponding color matrix when the measured color changes to the second temperature; and,
    assessing if the color is different from an expected color intended by the color input signal.

8. The method of claim 7 wherein the first temperature comprises a hot, just-fused temperature and the second temperature comprises a cooled ambient temperature.

9. The method of claim 8 wherein the measuring comprises a measuring with an embedded spectrophotometer.

10. The method of claim 8 further including measuring a temperature of the selected color using a temperature sensor.

11. The method of claim 7 wherein the measuring the selected color and the converting occur in real-time during job execution by the color printing device.

12. The method of claim 7 wherein the mapping comprises predetermining a thermochromaticity compensation matrix from empirical data including a set of sensor reflectance vectors.

13. A xerographic system to compensate for thermochromaticity differences in insitu spectral color measurements of a color printing device, comprising:
    a spectrophotometer associated with the color printing device for measuring reflectance values representative of a color printed by the color printing device, the measuring occurring at a first temperature; and,
    a controller for relating the measured reflectance values to a corresponding desired color of the printed color at an ambient temperature.

14. The system of claim 13 wherein the corresponding desired color is used as a basis for assessing operability of the xerographic system.

* * * * *